United States Patent [19]

Strobel

[11] 4,311,993
[45] Jan. 19, 1982

[54] MULTISEGMENT LIQUID CRYSTAL INDICATION SYSTEM

[75] Inventor: Felix Strobel, Greifensee, Switzerland

[73] Assignee: Mettler Instrumente AG, Greifensee, Switzerland

[21] Appl. No.: 193,408

[22] PCT Filed: Mar. 7, 1979

[86] PCT No.: PCT/CH79/00036
§ 371 Date: Feb. 9, 1980
§ 102(e) Date: Dec. 21, 1979

[87] PCT Pub. No.: WO80/00038
PCT Pub. Date: Jan. 10, 1980

[30] Foreign Application Priority Data

Jun. 9, 1978 [CH] Switzerland .................. 6301/78

[51] Int. Cl.³ ............................................. G08B 21/00
[52] U.S. Cl. .................................... 340/641; 340/642; 340/715; 340/765
[58] Field of Search ................... 340/715, 641, 642

[56] References Cited

U.S. PATENT DOCUMENTS 3,753,226 8/1973 Schnurmann et al. ......... 340/715 X
3,801,975 4/1974 Kitano ............................ 340/642 X
3,943,500 3/1976 Buchanan ........................ 340/642
4,188,625 2/1980 Hodemaekers .................. 340/642

FOREIGN PATENT DOCUMENTS 2530999 2/1976 Fed. Rep. of Germany.
2712398 9/1977 Fed. Rep. of Germany.

OTHER PUBLICATIONS

Wellington, "Continuous Monitor for Seven-Segment Displays", Electronics, vol. 47, No. 8, Apr. 18, 1974, p. 118.
Oliver, "Priority Encoder Simplifies Clock-to-Computer Interfaces", Electronics, vol. 49, No. 26, Dec. 23, 1976, p. 70.

Primary Examiner—David L. Trafton
Attorney, Agent, or Firm—Laubscher, Philpitt & Laubscher

[57] ABSTRACT

A circuit is described here for liquid crystal indication systems made up of segments which, using the capacitive performance of the indication system, automatically reveals errors that arise in the segments or due to short-circuits between segments.

The invention is adapted for use especially in scales that are to be guaranteed against functional errors.

8 Claims, 3 Drawing Figures

MULTISEGMENT LIQUID CRYSTAL INDICATION SYSTEM

BRIEF DESCRIPTION OF THE PRIOR ART

This invention relates to a single-digit or multi-digit multisegment liquid crystal indication system, especially for scales.

In all multisegment indication systems (which usually but not necessarily are built up as seven-segment indication systems) the problem must be faced of guaranteeing against malfunction, that is to say, the recognition of errors leading to inaccurate readings. It is known, in this connection, for example, that one can provide a testing key which causes all segments to light up for checkup purposes. This measure entails the considerable disadvantage that it does not constitute a lasting control and does not with absolute reliability exclude the possibility of erroneous readings. It is furthermore known (as taught by German patent application No. 24 21 991) that one can subdivide each segment into at least two subsegments which are selected and to which current is applied, independently of each other. In this way, the error is pointed out, in case one subsegment fails, due to the change in the indication reading. This measure however involves a considerable additional expenditure; besides, it is not exactly simple to design the subsegments in such a way that a defect will lead to a clearly recognizable error indication.

In the case of LED indication systems (luminous diode dials) it is possible to control the segment current and in this way to detect errors. This possibility is not present in liquid crystal dials whose small current consumption (in the nanoampere range) after all precisely represents an essential advantage of this type of indication system (among other things on account of the low heat loss).

SUMMARY OF THE INVENTION

The primary object of the present invention is to provide a single-digit or multi-digit multisegment liquid crystal indication which is fool proof against malfunctions while discarding the idea of segment subdivision, that is to say, doing something in order to make the failure of one segment automatically and clearly recognizable. To solve this problem, a circuit is proposed according to the invention for the surveillance of the capacitive relationship of segments. The surveillance circuit starts with the properties of the liquid crystal indication system and checks on the voltage/time characteristic of the capacitor formed by the segment, on the one hand, and by the counter-electrode or return electrode, on the other hand.

This principle can be implemented in various ways. For example, a sequential check can be performed in such a way that the individual segments are periodically successively compared with a reference information. Preference is given to one form of the invention in which the circuit encompasses a gate circuit which controls the segments to be watched in the rhythm of their selection and also includes an error indicator connected with the output of that gate circuit. This version permits simultaneous control over all segments under surveillance and, in view of the relatively short selection intervals, practically results in permanent surveillance. Through this measure, a defect in a segment line will practically be recognized immediately.

Another error possibility which is not too rare consists of short-circuits between two neighboring segments. In order to recognize such defects as well, a practical further development provides that neighboring segments are to be connected with the inputs of various gates of the gate circuit.

As a rule, the indication systems considered here are those with several decimals. In these cases it would be possible to associate each decimal with its own error indicator. In order to avoid the attendant, normally dispensable additional effort, there is preferably connected after the gate circuits of the individual decimals one additional, common gate circuit, after which there is connected one defect indicator that is common to all decimals; the additional gate circuit here is preferably a NAND gate and/or a NOR gate with inverter. With this measure an additional advantage is produced because it makes it possible to detect and report in two or more different simultaneously occurring failures of any segment. The principle of simple malfunction protection, which is to be implemented primarily through the invention, now demands that an individual error be recognized and accepts the much less probable case where two defects appear simultaneously and remain unrecognized because of their simultaneousness. The last-named variant of the invention thus permits malfunction protection going beyond the requirement described.

A key is provided to test the operation of the surveillance circuit.

In the customary seven-segment indication systems, not all segments are always equally critical. At any rate, in the indication of figures, the failure of certain segments already leads to an indication that can be recognized clearly as false or irrelevant. In these and other similar cases it is a good idea to introduce one version of the invention to simplify the circuit where only those segments are connected to the surveillance circuit whose failure would bring about ambiguity in the reading.

BRIEF DESCRIPTION OF THE DRAWING

In the following, examples of the invention will be described in greater detail with the help of the drawing in which.

DETAILED DESCRIPTION

Figure 1:
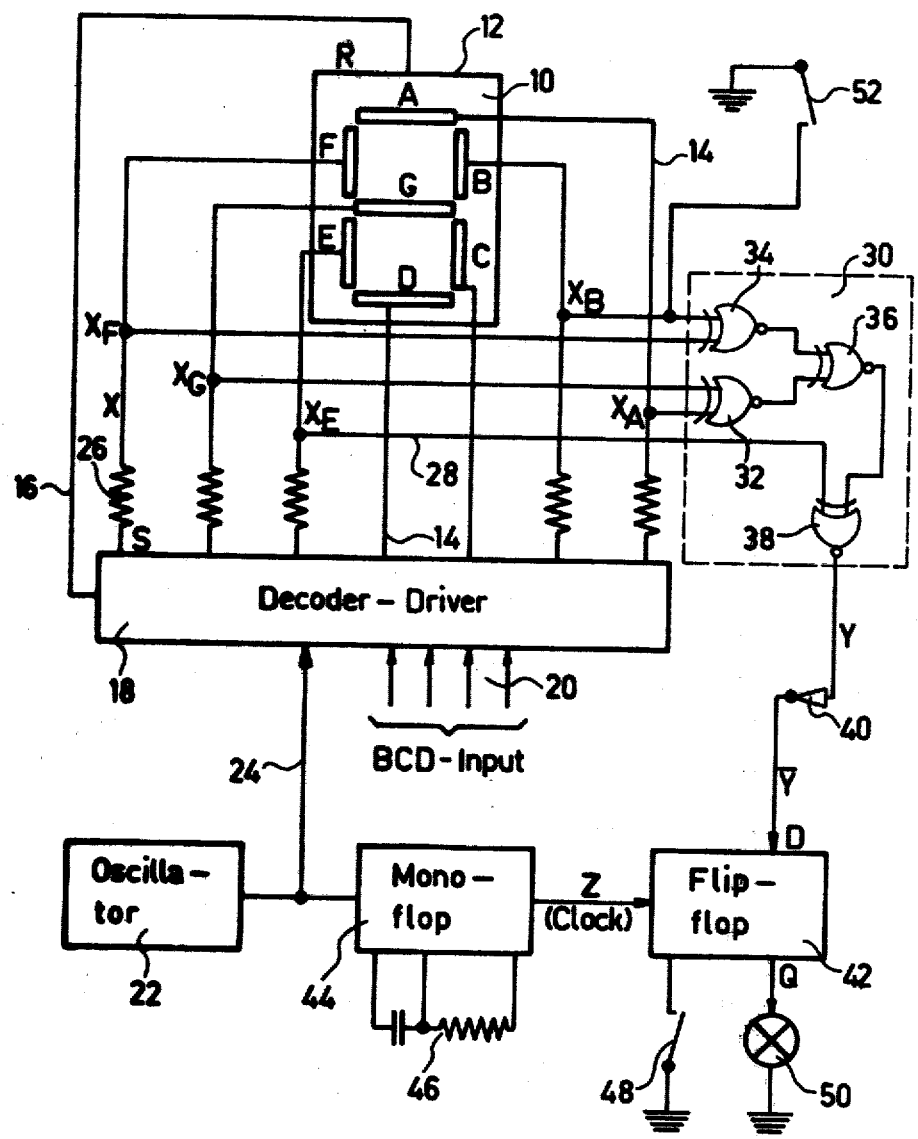
FIG. 1 is an illustration of a single-digit seven-segment indication system with surveillance circuit.

The single-digit liquid-crystal indication device 10 in FIG. 1 encompasses seven segments (electrodes) A to G, as well as a common return electrode 12 labeled R. The individual segments and the return electrode 12 are connected with a decoder-driver 18 via conductors 14 and 16, respectively. The measurement value to be indicated reaches the decoder-driver 18 in a digital manner via a BCD input 20.

The arrangement is powered in the known manner by an oscillator 22 via a line 24 with AC voltage. At regular intervals, for example, all condensers, consisting of segments A to G, on the one hand, and the common return electrode 12, on the other hand, are recharged and thus give us the luminous indication picture of the numeral "8". In the case of other numbers (or symbols)

to be indicated, only the corresponding segments are selected by the decoder-driver 18 in a selective manner.

Figure 3:
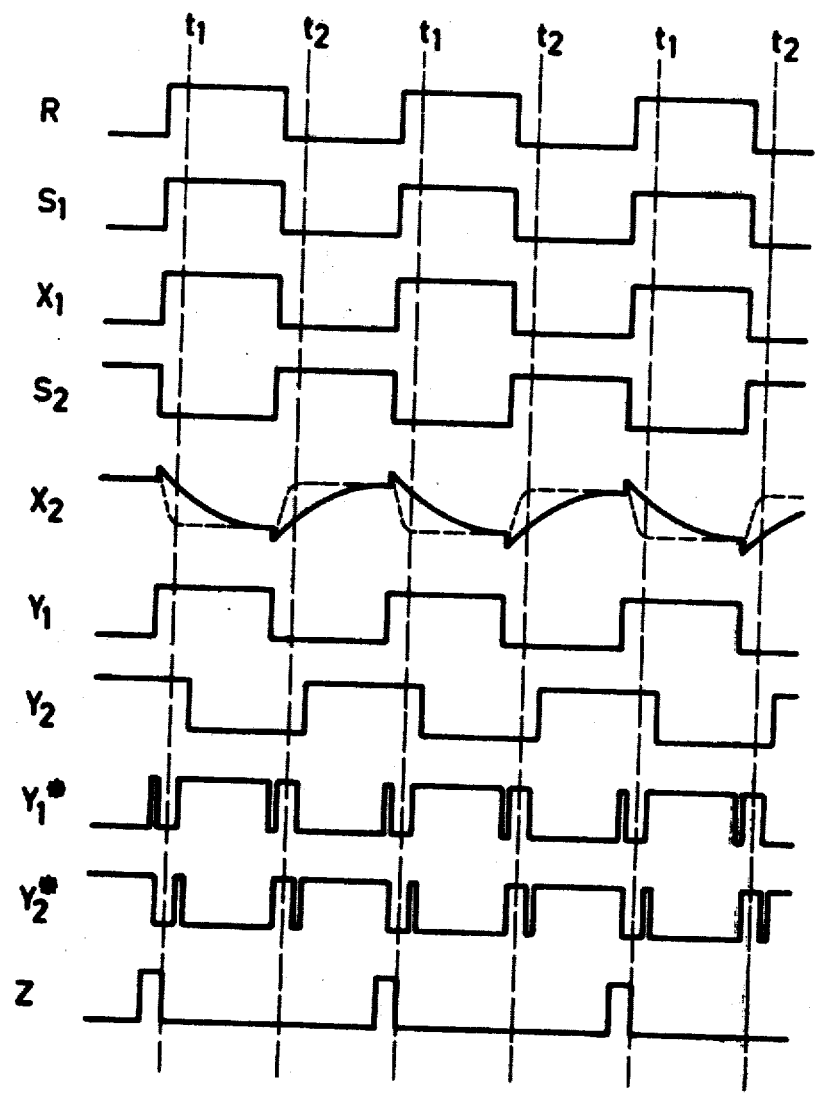
FIG. 3 is an illustration of the signal curve of the essential elements.

Referring now to the signal curves of FIG. 3, the rectangular AC voltage supplied by oscillator 22 (amounting to, for example, 100 Hz) affords the voltage curve R which is applied to the return electrode 12. The same curve shape, labeled $S_1$, is found for the voltage curve S at segments that are not selected, that is to say, there is no voltage between these segments and the return electrode 12. The reverse curve, labeled $S_2$, applies to those segments that are selected; here, we have a voltage which, during each period, twice changes its polarity between the segment and the return electrode 12.

The hitherto conventional arrangement is now modified as follows. In the lines 14, leading to segments A, B, E, F and G, there is inserted one, each, auxiliary resistance 26. Between it and the pertinent segment, there is in each case a branch line 28 leading to a gate circuit 30, consisting of four exclusive NOR (NOT/OR) gates 32, 34, 36 and 38. The output of gate circuit 30 is conducted to an inverter 40 the output of which is connected to the setting input of a bistable multivibrator (D-flipflop) 42. Between the oscillator 22 and the clock input of flipflop 42, there is connected a monostable multivibrator (monoflop) 44 provide with adjustable pulse width RC control branch 46. At the return set input of flipflop 42 there is furthermore provided a resetting key 48, and a control lamp 50 is connected with the Q-output terminal.

As shown in FIG. 3, the signal curve $X_1$ (rectangular voltage in the case of the segment to which current is not applied) corresponds to that of $S_1$. If on the other hand a segment is selected, then we get the signal curve $X_2$. In the normal case, that is to say, if the segment is intact, the gradual voltage change follows from the charging process of the condenser segment/return electrode shown by the solid line. If on the other hand a segment is defective (line break), then a considerably faster level change is produced in $X_2$ (as shown by the broken line). This phenomenon makes it possible, by controlling the level of $X_2$, at time $t_1$ or $t_2$, to test the correct functioning of the segment. The time interval between one side of the rectangular voltage and $t_1$ or $t_2$ must be determined empirically; it amounts to several microseconds, for example.

This version described here tests the operation of the indication system at time $t_1$. At that point in time, the signal lines $X_A$, $X_B$, $X_E$, $X_F$ and $X_G$ have high levels (curves $X_1$ or $X_2$) for all intact segments, regardless of whether or not they have been selected, that is to say, the output signal of the gate circuit 30 likewise has a high level (the same applies when all signal lines have low levels). Depending on whether an even or odd number of segments has been activated, there is produced the signal curve $Y_1$ (level already high at $t_1$) or $Y_2$ (level still high at $t_1$). If we have an error, then the voltage level change according to $X_2$ in FIG. 3 takes place faster and, at the testing moment, gate circuit 30 supplies an error signal $Y^*$ with a low level (curves $Y^*_1$ or $Y^*_2$).

The monoflop during each period of oscillator frequency supplies a rectangular impulse Z whose declining side forms the point in time $t_1$ (as determined by RC member 46) and which is applied at the clock input of flipflop 42. If, at point in time $t_1$, the setting input of flipflop 42 reveals a high level (error signal $Y^*$, inverted in the inverter 40), then the error indicator lamp 50 is energized via the Q output. This lamp can again be turned off by resetting the flipflop 42 manually by means of key 48 (or automatically with the help of a time member).

The arrangement described automatically tests the segments for correct operation through the generation of a comparison bit Y. Beyond that it detects —through the special combination of lines 28 with gate circuit 30—also short-circuits between neighboring segments (segments A and G leading to gate 32, segments B and F leading to gate 34) which otherwise might remain concealed.

With one testing key switch 52 we can check on the operation of the surveillance circuit: the key is inserted between line 28 of segment B and the ground. If switch 52 is closed, the corresponding input of gate 34 gets a low level, whereupon an artificial error signal is produced and lamp 50 is energized until switch 52 is released again and reset 48 is activated. If lamp 50 does not become energized, then a defect is present in the surveillance circuit (gate circuit 30, inverter 40, flipflop 42, or lamp 50).

Figure 2:
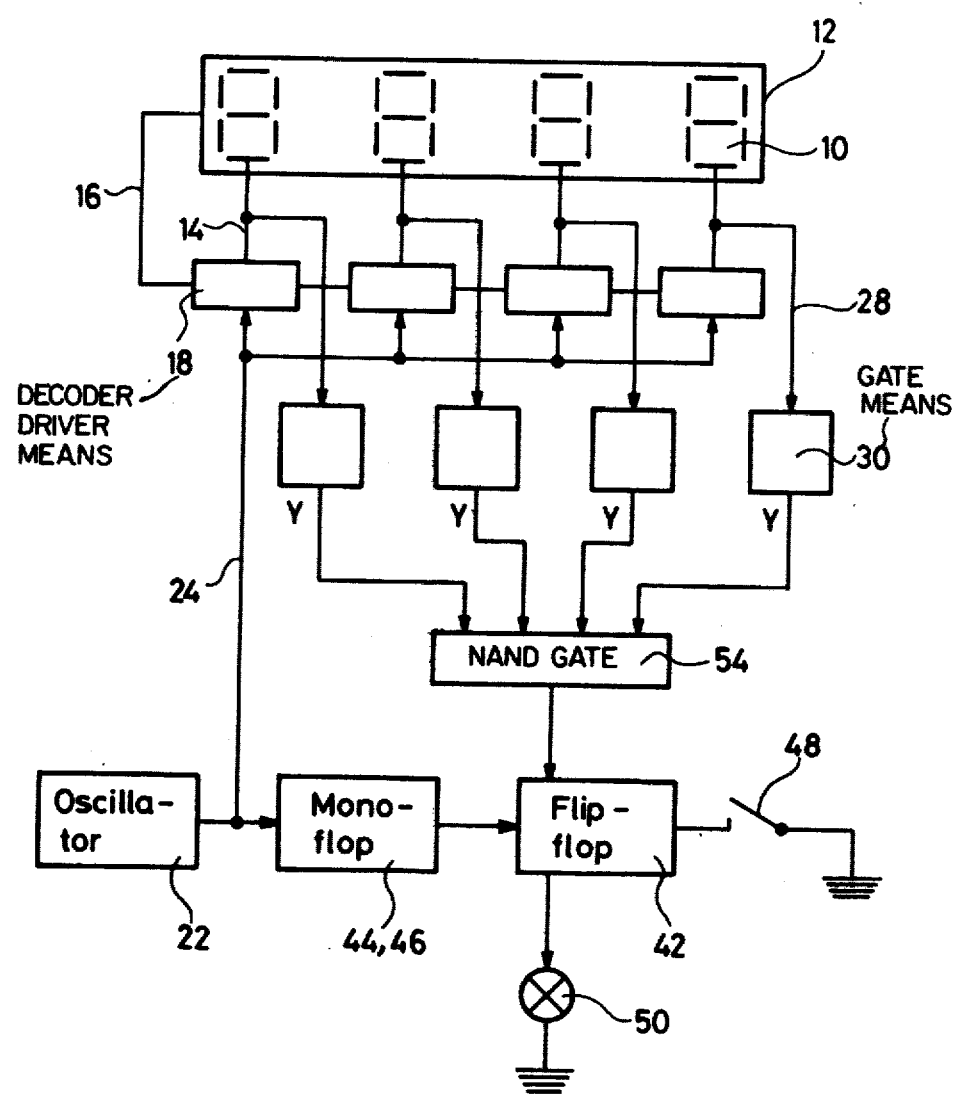
FIG. 2 is an illustration of a multi-digit seven-segment indication system with surveillance circuit.

The above-detailed description relates to single-digit indication. In the following description, the more frequent case of multi-digit indication will be explained with the help of FIG. 2. Because the structure of the arrangement essentially agrees with that in FIG. 1, we also used the same reference symbols to that extent.

Associated with one common return electrode 12 are four indication stages 10 which are simultaneously controlled by the common oscillator 22 via four decoder-driver stages 18 and associated conductors 14. Each indication stage 10 is connected via lines 28 with a gate circuit 30. Connected with the output of oscillator 22 is, once again, an adjustable monoflop 44, 46 and, connected with the output of the latter, a flipflop 42 with resetting key 48.

The elements described so far are built up exactly the same way as in the arrangement shown in FIG. 1. Return electrode 12 is different however, since here it is used jointly for all indication stages 10; each indication phase could just as well have its own partial-return electrode associated with it. Clock lines 24, leading to the individual decoder-driver stages 18, are furthermore provided here. The data lines leading to the latter (BCD inputs) are not drawn.

The individual outputs Y of gate circuits 30 are not inverted here but are directly connected to a NAND (NOT/AND) gate circuit 54 whose output is applied to the setting input of flipflop 42. This arrangement basically works the same way as the one in FIG. 1 and the signal curves in FIG. 3 are also the same. All segments of all decimals 10 are always tested simultaneously. By way of supplementation we might note however that the surveillance circuit through the use of the NAND gate 54 gives an error signal also if a failure or a short-circuit should take place simultaneously in several decimals.

If desired it would of course also be possible to have a separate control lamp for each decimal digit although that would mean a greater expenditure.

A testing possibility can be provided here also, similar to the testing key shown in FIG. 1. Depending upon the requirements, testing might be confined to only the control lamp 50, and might also include in the control means the gate circuit 54 or all gate circuits 30 by means of one or more testing keys.

The invention at hand is particularly important for the dials of scales but can be used advantageously where the immediate recognition of errors in liquid crystal indications is important.

In scales, for example, the indication of the sign might preferably also be checked in such a manner and/or the indication of the decimal point might be included in the surveillance circuit in the corresponding fashion.

For numerical indications, the above-described control of the five segments A, B, E, F, and G is regularly sufficient because the failure of segments C or D would not cause a misinterpretation of numerical readings. But if all segments are to be watched, for example, perhaps because other symbols (letters and so forth) are to be indicated, then the lines 14 of segments C and D must be supplemented with the auxiliary resistance 26 and the gate circuit 30 must be correspondingly widened.

According to the example shown, the control is performed at time $t_1$. Point in time $t_2$ is suitable in the same fashion. In this case one would merely have to replace the NAND gate 54 in FIG. 2 with an NOR gate with subsequent inverter and one would have to use the monoflop 44, 46 to form the point in time $t_2$.

It would furthermore be possible to perform the check at both points in time ($t_1$ and $t_2$). To do that, in FIG. 2, one would have to provide an additional monoflop 44, 46 as well as an additional flipflop 42 and, next to the NAND gate 54, a NOR gate with inverter, whereby the latter gate would likewise be impacted by all signals Y and would have to be connected in front of the additional flipflop. Th extra expenditure would be counterbalanced by the advantage that there would be a certain degree of automatic control over the gates 30.

Instead of a control lamp 50, one could cause the indication means to flash in case of error.

The method according to the invention permits a time-controlled, automatic surveillance which reliably reveals the most frequently occurring functional defects.

I claim:

1. In a multi-segment liquid crystal display system including a plurality of liquid crystal segments mounted on a common return electrode, and means for selectively activating said segments to display different visual images:

the improvement which comprises circuit means for selectively inspecting the capacitance properties of at least some of the segments, respectively, thereby to determine the operability of the indication system.

2. Apparatus as defined in claim 1, wherein said inspecting circuit means includes error indicating means (42, 50) normally having a first operating condition; and gate means (30) selectively connecting said segments with said error indicating means, thereby to operate said error indicating means to a second operating condition.

3. Apparatus as defined in claim 2, wherein said gate means includes a plurality of gate circuits each having a plurality of inputs, adjacent segments of the display means being connected with the inputs of different gate circuits, respectively.

4. Apparatus as defined in claim 5, wherein the display system includes a plurality of display digits each including a plurality of said segments, a plurality of said gate means being associated with each of said digits, respectively; and further including a common gate circuit (54) connecting all of said gate means with said error indicating means.

5. Apparatus as defined in claim 4, wherein said common gate means is a NAND gate.

6. Apparatus as defined in claim 3, and further including means including a NOR gate and an inverter for connecting said gate means with said error indicating means.

7. Apparatus as defined in claim 2, and further including manually operable key switch means (52) for testing the operation of said inspecting circuit means.

8. Apparatus as defined in claim 1, wherein at least one of the segments is always isolated from said inspecting circuit means, the remaining segments which are connected with said inspecting circuit means being those segments the failure of which would result in an ambiguity in the display reading.

* * * * *